United States Patent [19]

Funahashi et al.

[11] Patent Number: 5,763,839
[45] Date of Patent: Jun. 9, 1998

[54] DEVICE AND METHOD FOR DETECTING POSITION USING ELECTROMAGNETIC INDUCTION WITHOUT PRODUCING DISCREPANCY CAUSED BY THE RESIDUAL INDUCTION VOLTAGE OF THE RESONANT CIRCUIT

[75] Inventors: Takahiko Funahashi; Katsuhito Obi, both of Otone-machi, Japan

[73] Assignee: Wacom Co., Ltd, Otone-Machi, Japan

[21] Appl. No.: 506,811

[22] Filed: Jul. 25, 1995

[30] Foreign Application Priority Data

Jul. 27, 1994 [JP] Japan ................. 6-175794

[51] Int. Cl.$^6$ .................. G08C 21/00; G09G 3/02
[52] U.S. Cl. .................. 178/19; 178/18; 345/174; 345/179
[58] Field of Search ................. 178/18, 19, 20; 345/173, 174, 178, 179

[56] References Cited

U.S. PATENT DOCUMENTS

| | | | |
|---|---|---|---|
| 4,575,580 | 3/1986 | Jandrell | 178/18 |
| 4,878,553 | 11/1989 | Yamanami et al. | 178/18 |
| 5,534,886 | 7/1996 | Nomura et al. | 345/173 |
| 5,534,892 | 7/1996 | Tagawa | 178/18 |
| 5,561,447 | 10/1996 | Suzuki et al. | 345/179 |
| 5,606,346 | 2/1997 | Kai et al. | 345/173 |

FOREIGN PATENT DOCUMENTS

| | | | |
|---|---|---|---|
| 0 307 667 | 3/1987 | European Pat. Off. | 11/6 |
| 0 571 226 | 11/1993 | European Pat. Off. | 11/16 |
| 2-53805 | 11/1990 | Japan . | |

*Primary Examiner*—Curtis Kuntz
*Assistant Examiner*—Vijay Shankar
*Attorney, Agent, or Firm*—Shlesinger Arkwright & Garvey LLP

[57] ABSTRACT

The present invention provides a method and a device for detecting position without producing discrepancy caused by residual induction voltage of a resonant circuit, wherein it includes steps for selecting and scanning one of a multiple loop coil positioned parallel to each other towards a detecting direction to receive an electromagnetic wave (S1), and calculating coordinate values of the indicated position provided by a position indicator based upon at least two detected induction voltages (S3), a direction for selecting and scanning of the loop coils is alternatively changed (S5, 6), and the coordinate values are averaged to eliminate the residual induction voltage effect (S8).

21 Claims, 14 Drawing Sheets

DEVICE AND METHOD FOR DETECTING POSITION USING ELECTROMAGNETIC INDUCTION WITHOUT PRODUCING DISCREPANCY CAUSED BY THE RESIDUAL INDUCTION VOLTAGE OF THE RESONANT CIRCUIT

BACKGROUND OF THE INVENTION

1. Field of the Invention

This invention relates to an improvement of the method for detecting positions indicated by a positional indicators using electromagnetic induction or electromagnetic coupling respectively, and a corresponding device.

2. Description of the Prior Art

A positional detecting device was proposed prior to the present invention in Japanese Patent Application No. S61-213970, referred to as Japanese Patent Application Laid-open No. S63-70326, Japanese Patent Publication No. 2-53805 hereinafter called "the prior art", which was arranged to provide coordinates of indicated position by positional indicators, in which electric waves were received/transmitted between a sensor portion having a number of loop coils respectively positioned parallel to the direction being detected and the positional indicator.

Describing briefly the prior art mentioned above, one of the loop coils of a great number is selected and supplied with a current signal of a predetermined frequency causing a first electric wave to be transmitted, which is then received by a resonant circuit provided within a positional indicator. The resonant circuit generates a second electric wave in response to received the energy of the first electric wave from the loop coil mentioned above, which is again received by the one of the loop coils to generate inductive voltage. Such an operation is repeated for each of the loop coils in a sequential manner to form selecting and scanning, and calculation is made for the resonant circuit, as to the position or coordinate of the indicated position based on the magnitude of the inductive voltage generated from the respective loop coil.

In such a position detector device, it is a requirement that an input information representing a specified state (pen down) of indicated position is provided, in effect, a parameter, such as line thickness other than the coordinate in response to applied software, other information to change hue of specified position or area, or depth (brightness), as well as the coordinate value of the specified position.

In the prior art, the coil and capacitor comprising the resonant circuit are connected by a manually operated switch to another capacitor so that its resonant frequency can be slightly changed in response to the operation of the switch, and a small amount of the resonant frequency change is detected by the amount of the phase change of the frequency to provide several pieces of information mentioned above, each of which is called hereinafter "operation information".

Operating waveforms in the position detector device of the filed patent application mentioned above are shown in FIG. 2, wherein $T_1$, $T_2$, ... $T_6$, and $R_1$, $R_2$, ... $R_6$ are respectively indicating transmission periods of the electric wave and reception periods of the wave; and a indicates the transmission wave of the sensor portion, b, and b' are induced voltage of the resonant circuit, c, and c' indicate the reception signals in the sensing portion, and d, d' indicate the signals which are generated by rectifying the received signal and then filtering high frequency components from the rectified signal, which are hereinafter called "received induction signals".

The following description is made for the case where one of the loop coils is selected during transmission period $T_1$ and reception period $R_1$, a second loop coil adjacent to that of the one mentioned above is selected during transmission period $T_2$ and reception period $R_2$, and so on sequentially with the scanning manner in selecting loop coils positioned in same direction. Particularly, description is made for the case where the positional indicator or resonance circuit is located just above the loop coil which is selected during transmission period $T_3$ and reception period $R_3$.

The induced voltage, which is generated within the resonance circuit in response to receiving the electric wave transmitted during the first transmission period, is gradually decreasing during the reception period where the transmission wave is stopped, but will not disappear before the electric wave is transmitted by the following loop coil during the next transmission period and therefore has an effect on the reception/transmission of the waves by the following loop coil.

If there is coincidence between the frequencies of the transmission wave and the resonant circuit, then there is also coincidence between the phases of the induction voltage remaining in the resonant circuit and the voltage of the transmission wave, and these voltages are increasingly added. Thus, the received induction voltage d, the each of the levels of which are respectively corresponding with to that of the receiving periods $R_1$, $R_2$, ... $R_6$, tends to have greater level in the selecting and scanning direction (right side in FIG. 2) of the loop coils than the instance which does not have the effect.

If the resonant frequency in the resonant circuit is changed through operation of the switch, the phase of the induced voltage in the residual induced voltage during reception period is shifted (delayed in this case) so there is not always the coincidence between the phases of induction voltage that remained in the resonant circuit and the voltage of the transmission wave, as these voltages may cancel each other. This will result in the received induction voltage levels $V_1'$, $V_2'$, ... $V_6'$ shown at d in FIG. 2, each of which is provided with the corresponding one of the reception periods $R_1$, $R_2$, ... $R_6$, which show several changes in accordance with the amount of the phase shift.

The coordinate value by the positional indicator is normally calculated by arithmetic operations substituting two to four received induction voltages into a predetermined formula, so that an error is introduced into the coordinate of the indicator position with the level changes in the received induction voltage caused by the residual induction voltage in the resonant circuit mentioned above.

In the prior art, a compensation value is calculated in advance for each of the corresponding phase angles and, it is stored in memory, and the compensation for the respective coordinate is performed by reading out the corresponding compensation value with the phase angle from the memory. However, the problem of this compensation is that it requires substantial memories for storing the compensation values.

Further, if no selectable loop coil exists before the loop coil to be used in the arithmetic operation for generating receiving induction voltage, that is, no residual induction voltage exists in the resonant circuit, since the position detector is located near the end of the positional detecting direction, then the level of the receiving induction voltage used for the calculating operation is poor when compared with the case where the position indicator is positioned away from the end of the position detecting direction, that is, the case where the residual induction voltage exists. Thus, there is a problem which introduces an error in the coordination value of indicator position.

It should be noted that the displacement in the coordinate value caused by the residual induction voltage mentioned above is of course a problem caused by not only the residual induction voltage in the resonant circuit, but also by the residual voltage in the detecting circuit of received signal, as for instance the residual voltage in a filter for eliminating high frequency components from received signal. Therefore, the problem may be commonly experienced not only in the positional detector device, using the indicator having the resonant circuit such as that of the prior art, but also in a positional detector device of all types which calculates the coordinate value of indicated position from the induction voltage detected at that time.

Furthermore, the positional detections mentioned above are normally performed in alternating ways between two orthogonal directions for the positional detection, that is between two groups of multiple loop coils positioned parallel with each other along the X and Y axial directions respectively. The indicated position of the positional indicator at a certain time is represented by an attained pair of coordinate values of the X and Y axes. It still has the problem that it causes the so called "bowing phenomenon" to be generated, such that an inevitable timing difference exists between these values so that the indicated position represented by the combination thereof results in being different from the actual position, even though each of the detected values of X and Y axes is accurate in itself with the positional indicator being moved rapidly over the coils.

The generated state of bowing effect mentioned above is shown in FIG. 3 wherein the positional indicator moves quickly from Origin O to Point M along the solid line 100 along the direction shown by the arrow.

If the detection is made with the positional detector being placed at the position $P_1$, then a coordinate value $X_1$ will be given, but if the positional indicator moves to the position $P_1'$ along the solid line 100 before the coordinate value of Y axis that is paired with the coordinate value $x_1$ comes to be detected so that the coordinate value $y_1$ is calculated instead. It results in the indicator position of the detection indicator becoming the position represented by the coordinate values $x_1$ and $y_1$, that is, position $P_1^*$ which is far from the solid line 100.

Similarly, the indicator positions of the detection indicator are the positions $P_2^*, P_3^*, \ldots$ represented by the coordinate values $x_2$ and $y_2$; $x_3$ and $y_3$; ..., and the positional indicator identifies the coordinate values along the dotted line 101 other than the solid line 100. It should be noted that the reason for the dotted line 101 being arched is that the moving velocity of the positional indicator near the mid portion is faster than that of the origin or Point M so that the indicator position of the detection indicator at the detecting time of X and Y axial directions takes it further away from the position along the solid line.

Also, if the detection indicator moves rapidly from Point M to the origin O along the solid line 100, the dotted line 102 is identified as if the indicator moves along it by the same reason.

It should be noted that the bowing phenomenon is a common problem not only with the positional detecting device using positional indicator having such resonator circuit as the prior art, or using electromagnetic or electrostatic induction, but also for all types of positional detectors which detect the coordinate of X and Y axes separately since the phenomenon results from the timing discrepancy in the coordinates of X and Y axes.

SUMMARY OF THE INVENTION

It is a first object of the present invention to provide a method for detecting position without producing any discrepancy between coordinate values due to residual induction voltage in a circuit and to provide a device thereof.

It is a second object of the present invention to provide a method for detecting position without producing any error of coordinate values at peripheral portions of coordinate detection region and to provide a device thereof.

It is a third object of the present invention to provide a method for detecting position without producing the bowing phenomenon caused by timing discrepancy in detecting coordinate values of X and Y axes.

For purpose to attain the first object, the present invention provides a method and device for detecting position, including: detecting induction voltage produced by electromagnetic effect between one of multiple loop coils positioned parallel to each other towards a positional detecting direction and a position indicator having at least one coil, for selecting and scanning another one of said loop coils to allow it to repeat said detecting step for each loop coils, and calculating coordinate values of the indicated position provided by said position indicator based upon at least two detected induction voltages, wherein said selecting and scanning step includes an alternating operation between different directions, and said calculating step includes averaging said coordinate values of the indicated positions based upon the respective induction voltages at the time of said alternating operation.

For purpose to attain the second object, the present invention provides a method and device for detecting a position, including step of selecting and scanning one of said loop coils for detecting induction voltage produced by electromagnetic effect between one of multiple loop coils positioned parallel to each other towards a positional detecting direction and a position indicator having at least one coil, and if the position of the position indicator is not identified, then repeating said step of selecting and scanning, otherwise, repeating said step of selecting and scanning for a predetermined number of the loop coils centering the loop coil from which the maximum induction voltage is detected among the multiple loop coils, and calculating coordinate values of the indicated position provided by said position indicator based upon at least two detected induction voltages, wherein if the number of said loop coils selectable is not reached by the said predetermined number at the place where the position indicator is positioned at one end towards the position detecting direction or near the other end, and the selecting and scanning is performed from said one end to the other end or vice versa, then select the loop coil which is located at symmetrical position of the loop coil producing the maximum induction voltage before the loop coil at the one end or the other end is selected.

Further, in order attain the third object, the present invention provides a method and device for detecting a position, including: detection of physical variables produced by physical effect between one of multiple physical detecting means positioned parallel to each other towards X and Y axes and a position indicator, for selecting and scanning another one of said multiple physical detecting means to allow repetition of said detecting step for said physical detecting means of X and Y axes, and calculating coordinate values of the indicated position of X and Y axes by said position indicator based upon at least two detected induction voltages, wherein if a coordinate detecting period is determined together with selecting and scanning periods for selecting and scanning said physical detecting means of X and Y axes respectively, alternation is performed between said selecting and scanning periods for selecting and scanning said physical detecting means of X and Y axes each time of the coordinate detecting period, and averaging even number of timely sequenced coordination values of the indicated position of X and Y axes resulting from the physical changes from when said alternation was performed.

According to the present invention, the discrepancy in the coordinate value of indicated position, which results from the residual induction voltage, and which is detected based upon the induction voltage produced by selecting and scanning the loop coils, has a reversed relationship between that detected during one direction for selecting and scanning of the multiple loop coils and the other direction. This is true even if the frequency of the resonant circuit does not coincide with the frequency of the transmission wave so that averaging these coordination values may cancel the discrepancy.

Furthermore, according to the present invention, even when the position indicator is placed near the end towards the position detecting direction, a pseudo-loop coil can be suitably set before selecting the loop coil at the detection point of induction voltage which is to be used during the arithmetic operation, for calculating the coordinate values, whereby a residual induction voltage can be generated similarly to where the positional indicator is not at the end towards the position detect direction, and can calculate the coordinate value of a small error.

Furthermore, according to the present invention, the discrepancy from the real position to be indicated, which results from the detect time difference for X and Y axes, differs depending on whether selecting and scanning of the position detecting means towards Y axis is performed after that of the X axis, or selecting and scanning of the position detecting means towards X axis is performed after that of the Y axis. The former results in the discrepancy of the coordinate value of X axis, and the latter results in Y axis. Therefore, averaging each of the even number of time sequenced coordinate values of indicated position of X and Y axes will cancel the discrepancy of the coordinate value in each direction.

DETAIL DESCRIPTION OF THE PREFERRED EMBODIMENT

Figure 1:
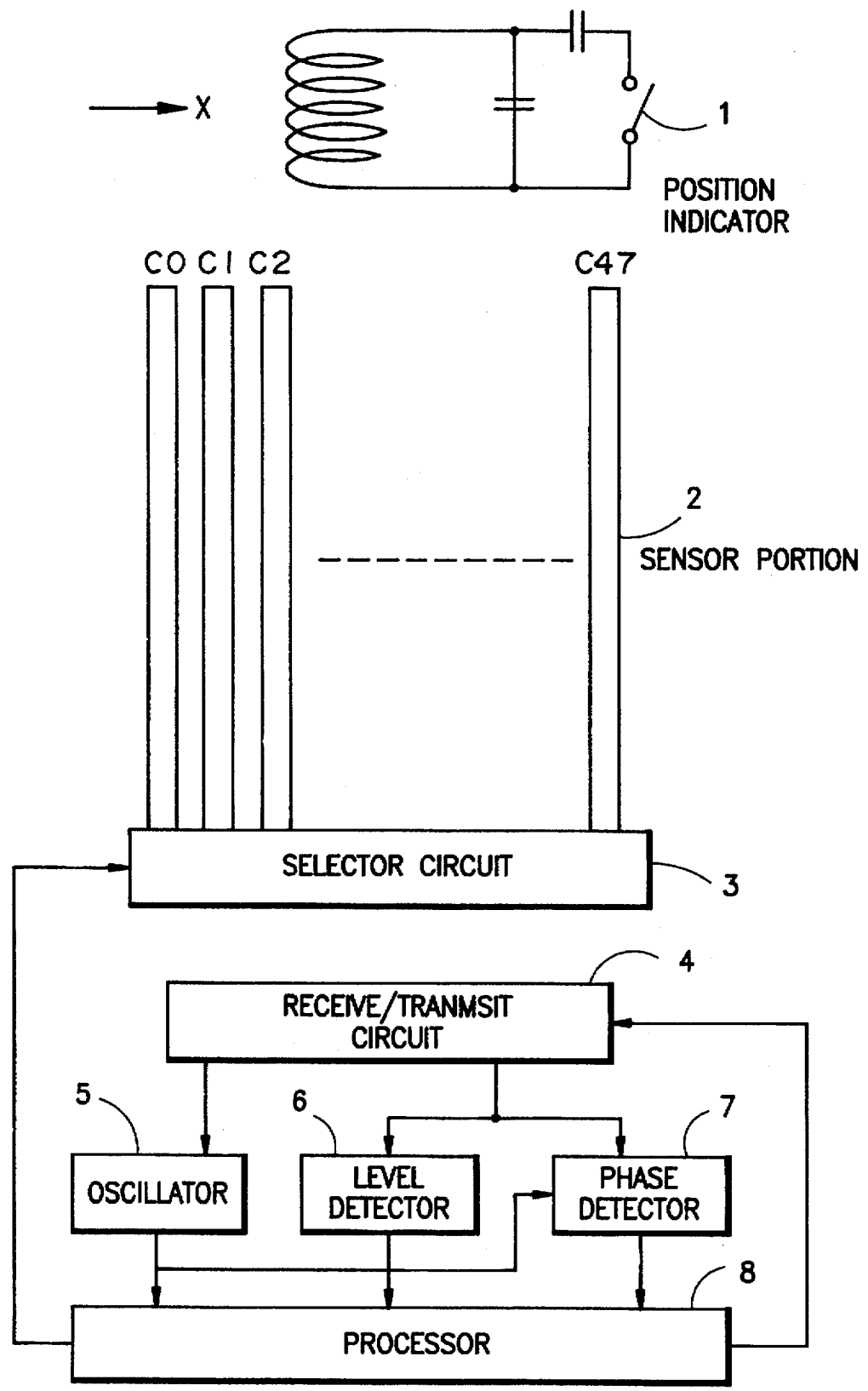
FIG. 1 is a hardware configuration of a first embodiment according to the present invention.
Figure 2:
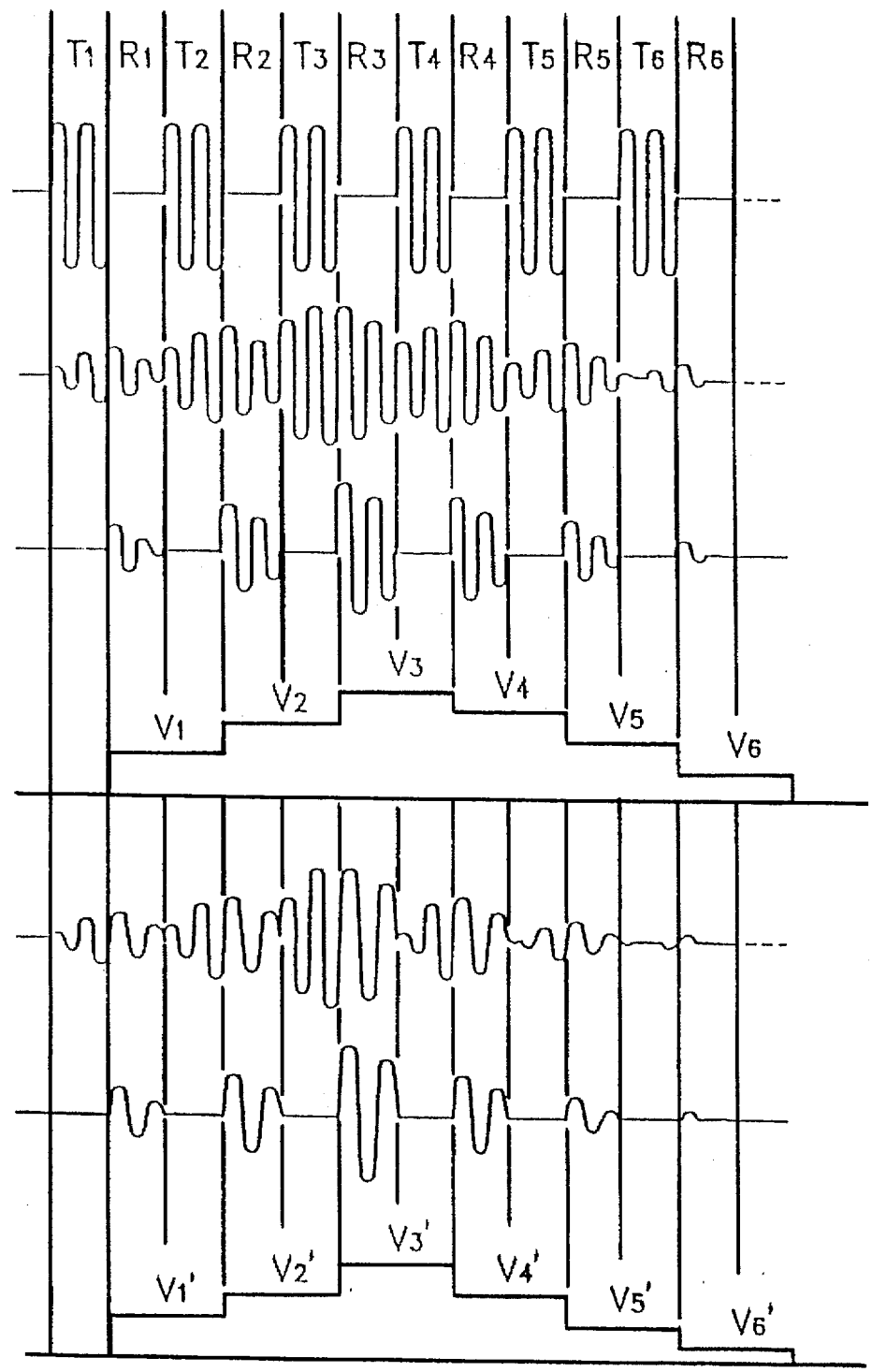
FIG. 2 is an illustrative waveform showing operation in position detection device of the prior art.

A hardware configuration of the first preferred embodiment of the present invention, shown in simplified form in FIG. 1, which is substantially the same as that of the prior art wherein reference number 1 is a position indicator, 2 is a sensor portion, 3 is a selector circuit, 4 is a receive/transmit switching circuit, 5 is an oscillator, 6 is level detector circuit, 7 is a phase detector circuit, and 8 is a processor.

The position indicator 1 includes a resonant circuit which has a coil, capacitors and a switch, and which has a predetermined frequency $f_0$ as a resonance frequency when the switch is set in off-state, and has another resonant frequency $f_1$ which is, for example, a little bit lower than the resonant frequency $f_0$ when the switch is set in on-state.

The sensor portion 2 has a number of loop coils, for example forty eight loop coils C0, C1, C2, . . . C47, respectively positioned parallel towards position detecting direction (in this example, along the X axis).

The selector circuit 3 operates based upon a select information from the processor 8 to select one of forty eight loop coils in sensor portion 2. The receive/transmit switching circuit 4 operates based upon a switch information to alteratively connect the selected one of the loop coils to the oscillator 5, or the level detector circuit 6 and the phase detector circuit 7.

The oscillator 5 generates the predetermined frequency $f_0$ for the reference clock, which is provided to the phase detector circuit 7, a processor 8 , and the receive/transmit circuit 4 via a low pass filter and a current driver, both of which are not shown. The level detect detector circuit 6 includes a detector and a low pass filter having a cut off frequency which is sufficiently lower than the frequency $f_0$, and outputs a DC signal which has a corresponding level with the energy of the frequency $f_0$ component among the received signals which is amplified by an amplifier (not shown). The phase detector circuit 7 includes a phase detector and a low pass filter having the cut off frequency which is sufficiently lower than the frequency $f_0$, and outputs a DC signal which has a corresponding phase difference between the received signals which is amplified by an amplifier (not shown) and the reference clock.

The processor includes a well known microprocessor for generating receive/transmit signal by the reference clock of the frequency $f_0$ to supply to the receive/transmit switching circuit 4; for controlling the selector circuit 3 to switch the loop coils in sensor portion 2; for performing analog/digital conversion (A/D) to the output of the level detector circuit; for performing arithmetic operation to calculate the coordinate value of the indicating position by the positional indicator 1; averaging said coordinate value as described later; and for determining the state of the switch in the positional indicator 1.

Figure 4:
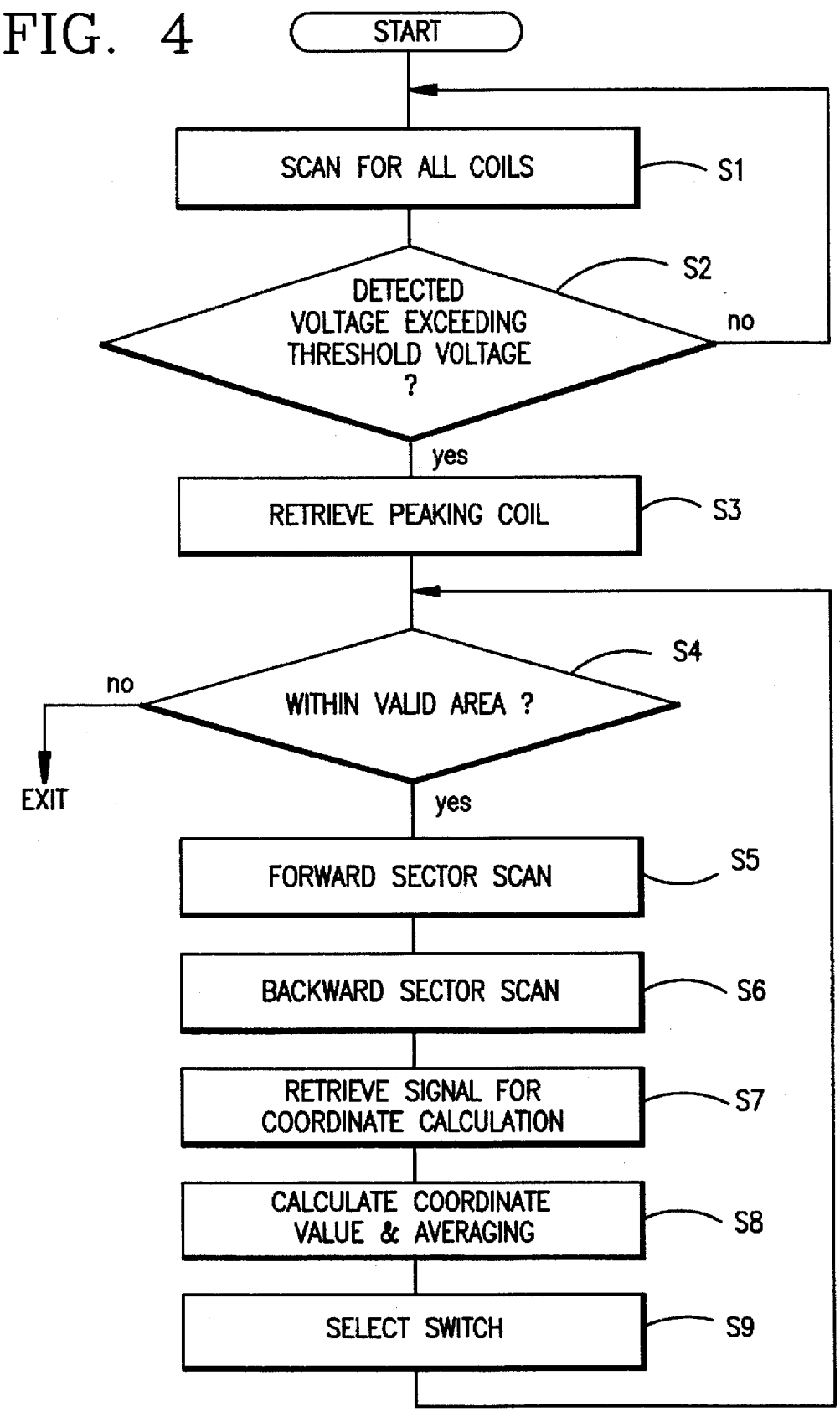
FIG. 4 is a flowchart showing a software configuration of the first embodiment.

The flowchart performed by the processor according to the present invention is shown in FIG. 4, and in conjunction with this an operation will now be explained.

Firstly, the processor sends out an information to the select circuit 3 for selecting the loop coil in the sensor portion 2, and select signal to the receive/transmit switching circuit 4, through which a sinusoidal signal of the frequency $f_0$ based upon the reference clock of the oscillator 5 is sent to the loop coil C0, which emits an electric wave of frequency $f_0$. If the positional indicator 1 is positioned on the sensor portion 2 at that time, then the emitted electric wave energizes the resonant circuit in the positional detector so that an induction voltage of frequency $f_0$ is generated within the circuit.

The processor 8 sends out a signal for selecting transmit side for a predetermined time, and then sends out a signal for selecting receive side to cease the wave generated by the loop coil C0. During these periods, the induction voltage generated in the resonance circuit of the positional indicator 1 will attenuate in accordance with the circuit loss with the emission at the wave of frequency $f_0$, which drives the loop coil C0 backward to generate an induction voltage therein.

Again, the processor 8 sends out the signal for selecting transmit side at the predetermined time, and then sends out the signal for selecting receive side and so on until the receiving and transmitting of the wave to the loop coil C0 is repeated for a number of times, for example, four times. Next, the processor 8 changes the information sent to the selector circuit 3 such that the selection is switched to the loop coil C1, and similar receive/transmit operation is sequentially performed for each of the loop coils C2–C47 of the sensor portion 2 to receive/transmit the wave (step S1).

It should be noted that the selection can be made for suitable interval such as every other, every two and so on without selecting all of the coils C0–C47 in the sensor portion 2.

During the four reception period described above, each of the induction voltages generated in the loop coils is rectified to convert to DC signal and averaged in the band pass filter in the level detect circuit 6, the output of which is sent out to the processor 8. The voltage level of the DC signal has a value which depends on the distance between the positional indicator and the specific loop coil selected so that the processor 8 determines whether or not the maximum value exceeds a predetermined threshold voltage level, that is, the processor determines whether or not the positional indicator 1 will allow the sensor portion 2 to output with a valid read level (step S2).

If the processor 8 determines that the positional indicator 1 is positioned at the place where the aforementioned valid read level is given, it then identifies the loop coil which has the maximum value (hereinafter called the "peaking coil") among the signals from the selected loop coils (step S3), and determines whether or not the positional indicator 1 is located within the valid detection area, which in this case means whether or not the peaking coil corresponds to the loop coil C0 or C47 at the end (step S4). If the positional indicator is located out of the valid detection area, then the processor exits the detection process or jumps to another process which detects the position by using some suitable method. If the positional indicator 1 does not provide the output showing within the valid level, then back to repeat the step 1 and 2.

Figure 5:
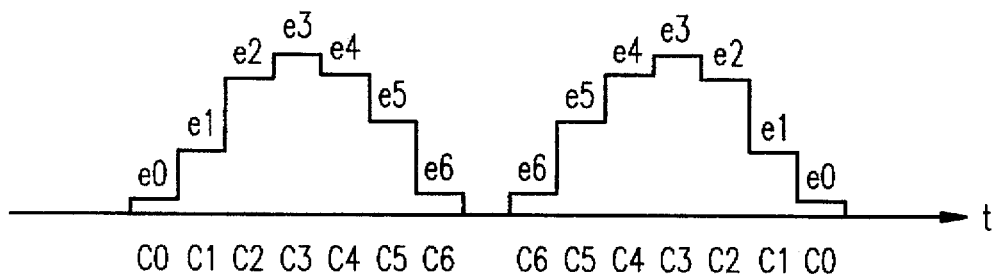
FIG. 5 is an illustrative drawing showing signals provided by a forward and backward sector scanning.
Figure 6:
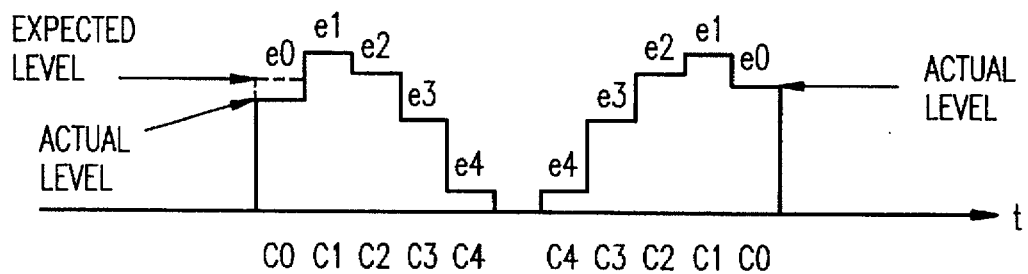
FIG. 6 is an illustrative drawing similar to FIG. 5 having the peak coil of the loop coil $C_1$.

If the positional indicator 1 is located within the valid detection area, then the processor 6 scans to select a predetermined number of loop coils, for instance, seven loop coils around the peak coil (PC) from the smaller number to the larger number (forward) to receive/transmit the wave similarly as mentioned above (Step S5), and further selecting and scanning of the same seven loop coils sequentially from the larger number to the smaller number (backward) to receive/transmit the wave similarly as mentioned above (Step S6). FIG. 5 shows the induction voltages generated by the procedures of Step 5 and 6 when the peaking coil is C3.

When the partial forward and backward selections (sector scanning) of the loop coils centering about the aforementioned peaking coil are completed, the processor 8 retrieves a set of the induction voltages, for instance three (e2, e3 and e4) in the voltage level order from each of the forward and backward sector scans (Step S7), and calculates a coordinate value based upon these signals as described in the prior art to provide a indicated position by the positional indicator 1 for each of the selecting and scanning direction, which is averaged (Step 8).

Now, the induction voltage generated in the resonance circuit by the electric wave transmitted by a loop coil as described in the prior art section remains without being completely attenuated until the electromagnetic wave is transmitted by the next loop coil, which effects the receive/transmit of the electric wave of the next loop coil, which adversely acts with respect to the forward and backward scanning of the loop coil.

The residual voltage in the resonant circuit will change each of the induction voltage values in the corresponding loop coils, but it changes adversely with respect to the other so that the respective induction voltage has a symmetrical waveform as shown in FIG. 5 for the forward and backward sector scans.

Furthermore, when the switch of the resonant circuit in the positional indicator 1 is set to on, the resonant frequency of the circuit changes from $f_0$ to $f_1$, which causes the phase of the residual induction voltage in the resonant circuit to not coincide with the next transmission wave, so that even the respective induction voltage corresponding to each of the loop coils is changed, each of the induction voltages of the forward sector scanning is held to be symmetrical with the corresponding induction voltage of the backward sector scanning.

The change in each of the induction voltages causes discrepancies to be generated as the operational result of the coordination value of the indicator position, wherein the discrepancy in the coordination value based upon each of the induction voltage of the forward sector scanning has revere relationship with that of reverse sector scans.

As discussed above, according to the present invention, the sector scans are performed both forward and backward to calculate each of the coordinate values, the result of which is averaged so that the discrepancy of the coordinate value mentioned above is cancelled, thus there is no need to compensate and even with the change of the resonant frequency in the resonant circuit of the positional indicator, an accurate detection of the coordinate value of the positional indicator can be attained.

It should be noted that the change of the resonant frequency in the resonant circuit of the positional indicator mentioned above is provided by the phase detector 7 as a DC signal representing the phase change, which enables the processor to identify the state of the switch in the positional indicator (Step S9).

In the embodiment just described, if the peaking coil corresponds to the loop coil C1, three signals e0, e1 and e2 which are needed for calculating the corresponding coordinate thereof can be provided, but the level of the signal e1 of the loop coil C0 has lower level than the required detection level (i.e., the level that should be detected if any loop coil exists beyond the loop coil C0) as mentioned in the prior art section since no selectable loop coil exists beyond the loop coil C0 in the forward scanning. Thus, these coordinate values based upon the signals detected during this forward scanning may include significant errors. It should be noted that for backward scanning a selectable loop coil exists beyond the loop coil C0, i.e., the loop coil C1 so no problem occurs.

Figure 7:
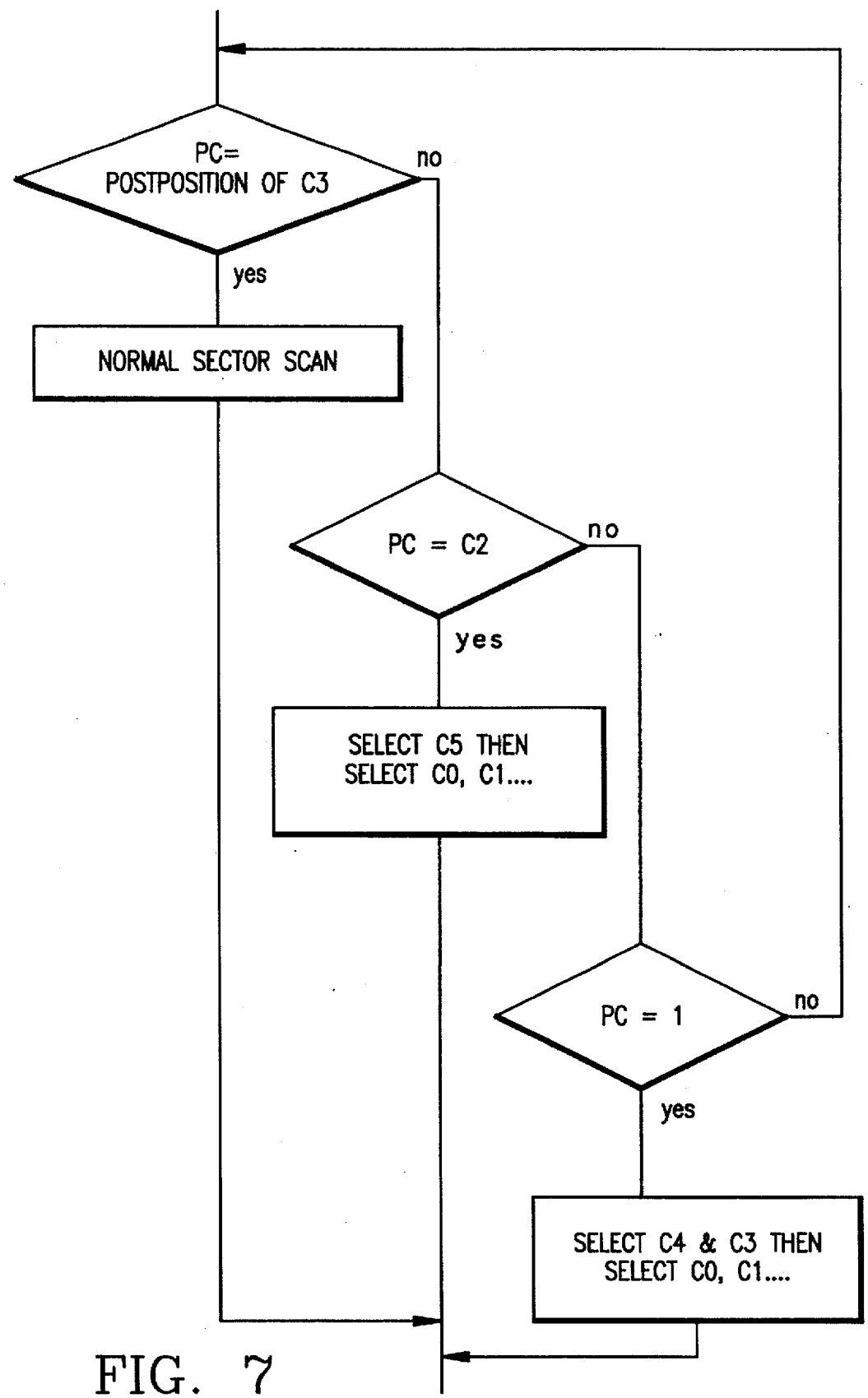
FIG. 7 is a flowchart of the forward sector scanning after the improvement.
Figure 8:
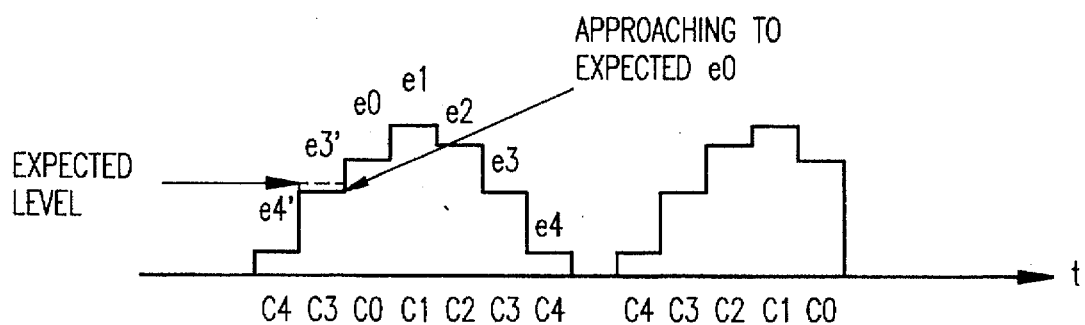
FIG. 8 is an illustrative drawing similar to FIG. 6 using the flowchart of FIG. 7.
Figure 9:
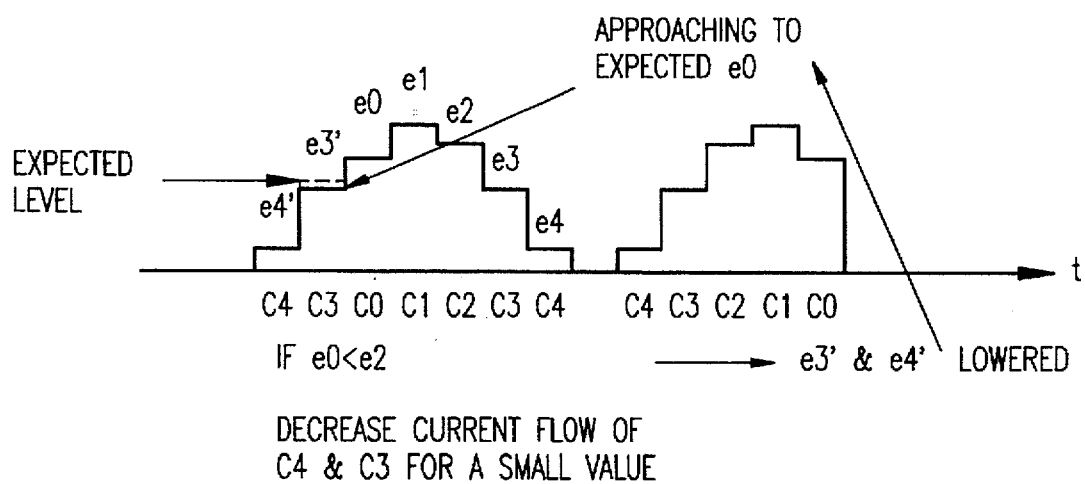
FIG. 9 is an illustrative drawing similar to FIG. 8 except with the addition of enforced control of the wave.

FIG. 7 shows the flowchart of the improved forward sector scanning process for the aforementioned points. When the loop coil C1 corresponds with the peak coil, the loop coils C4 and C3 are selected before the loop coil C0 to receive/transmit the electric wave, and thus signals e3' and e4' are generated as shown in FIG. 8 resulting a pseudo selectable loop coil to exist beyond the loop coil C0, which causes the level of the signal e0 to have a normal level, which can in turn lower the error mentioned above.

Also, if the loop coil C4 and C3 are selected before the loop coil is selected, then errors can be further lowered by controlling the electric wave generated by the loop coils C4 and C3. That is, when the signal levels of the both ends of the loop coils, (in this case C0 and C2), are mutually compared, it is determined which signal level of the loop coil is lower. If the signal level of the loop coil is determined to be lower, then the amount of current provided by the loop coils C4 and C3, which are selected before the loop coil C0, is decreased from the original level, otherwise, the amount of current is increased. Thereby, the strength of the electric wave can be decreased or increased so that the signal level e3' and e4' then can be made substantially same as the case where any loop coil to be selected exists in fact before the loop coil C0 comes to be selected, which also enables the level of the signal e0 in the loop coil C0 to be further from the original level, and to lower the error. It should be noted that as the loop coils C0 and C1 may be selected instead of selecting the loop coils C3 and C4, and these current levels may also be controlled so that the signals e3' and e4' mentioned above are generated.

If the loop coil C2 corresponds with the peak coil, then the loop coil C5 is selected before the loop coil C0 comes to be selected as shown in FIG. 7 to receive/transmit so that the error of the coordinate value can be lowered similarly as the case mentioned above. Also in this case the strength of the electric wave generated by the loop coil C5 may be controlled so that the error of the coordinate value is further lowered. It should be noted that loop coil C0 such as may be selected instead of selecting the loop coil C5, and the current level thereof may also be controlled.

Figure 10:
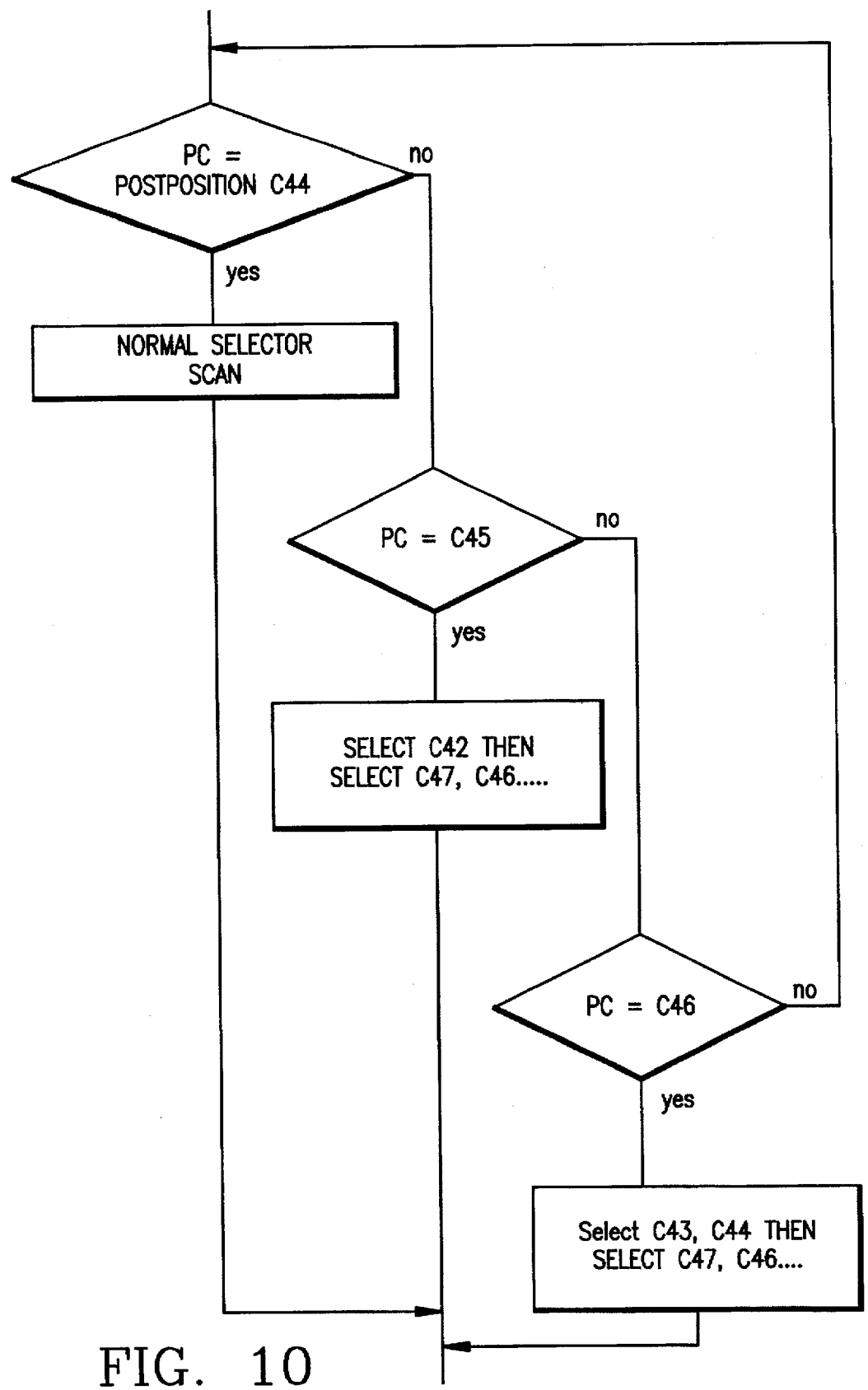
FIG. 10 is the flowchart showing the backward sector scanning after improvement.

Also, in the embodiment described above, a similar problem occurs when the loop coils C45 and C46 correspond with the peaking coil with the backward scanning. FIG. 10 shows the processing flowchart of backward scanning which improves that problem, in which a similar process is performed to that of FIG. 7 so that the error is decreased. It can be said to be similar in that the strength of the electric wave generated by the loop coil, which comes to be selected before the loop coil C47, may be controlled so that the error of the coordinate value is further decreased.

Figure 11:
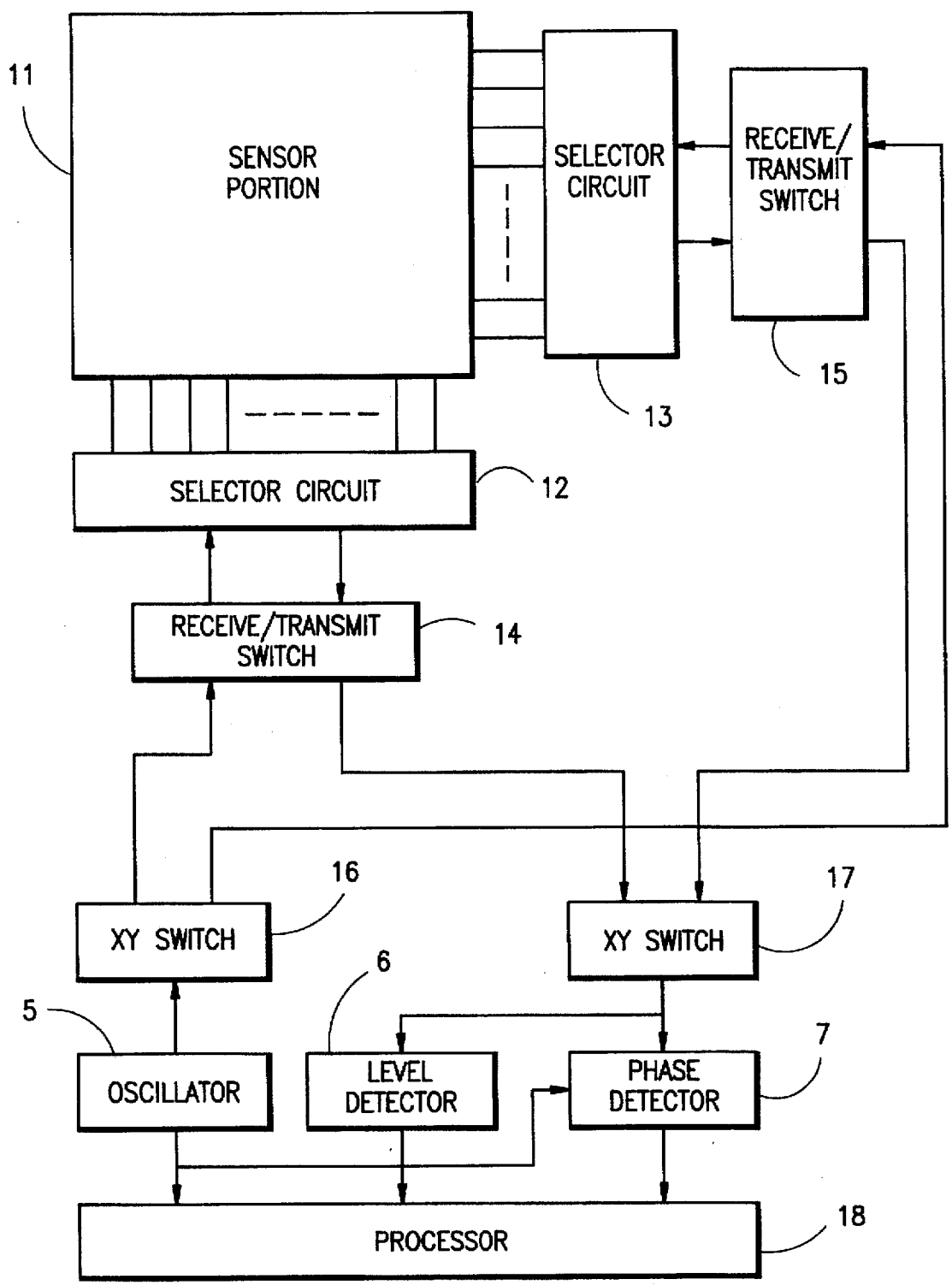
FIG. 11 is a hardware configuration of a second embodiment according to the present invention.

FIG. 11 shows the hardware configuration of the second embodiment of the present invention, wherein similar components with that of the first embodiment are referred to with similar numbers, and wherein the positional detection is performed respectively in two directions of X and Y axes which are orthogonal with each other. In the figures, 5 denotes an oscillator, 6 denotes a level detector circuit, 7 denotes a phase detector circuit, 11 denotes a sensor portion, 12 and 13 selector circuit, 14 and 15 denote receive/transmit switch circuit, 16 and 17 denote X and Y switch circuit and 18 denotes processor. To simplify the drawing, control line is not shown.

The sensor portion 11 has a number of loop coils, e.g., forty eight loop coils positioned parallel to each other along X axis and a number of loop coils, e.g., forty eight of loop coils, similarly along the X axis, and this number of loop coils are not shown in the figure. The selector circuit 12 selects one of the forty eight loop coils along X axis, and the selector circuit 13 selects one of the forty eight loop coils along Y axis, both of which operate in response with the select information from the processor 18.

The receive/transmit switching circuit 14 operates based upon a switching signal from the processor 18, and alternately connects the selected loop coil in the X axis to the oscillator 5, or the level detector circuit 6 and the phase detector circuit 7 via the X and Y switching circuit 16 and 17, and also alternately connects the selected loop coil in the Y axis to the oscillator 5, or the level detector circuit 6 and the phase detector circuit 7 via the X and Y switching circuit 16 and 17.

The X and Y switching circuit 16 operates based upon the X and Y switching signal from the processor 18, and provides the reference clock of the frequency $f_0$ generated by the oscillator 5 to the receive/transmit switching circuit 14 and 15 via a low pass filter (not shown) and a current driver. The X and Y switching circuit 17 operates based upon the X and Y switching signal from the processor 18, and alternately connects the respectively selected loop coils of X and Y axes, which are selected by the selecting or circuits 12 and 13, to the level detector circuit 6 and the phase detector circuit 7 via the receive/transmit switching circuit 14 and 15. X and Y switching circuit 16 and 17.

The processor 18 includes a well known microprocessor for generating receive/transmit signal by the reference clock of the frequency $f_0$ to supply to the receive/transmit switching circuit 14 and 15; for controlling the selecting or circuit 12 and 13; the X and Y switching 16 and 17 to switch the loop coils in sensor portion 11; for performing analog/digital conversion (A/D) to the output level of the level detector circuit; for performing a predetermined arithmetic operation to calculate the coordinate value of the indicating position by the positional indicator (not shown); averaging said coordinate value as described later; and also for detecting the state of the switch in the positional indicator.

Figure 12:
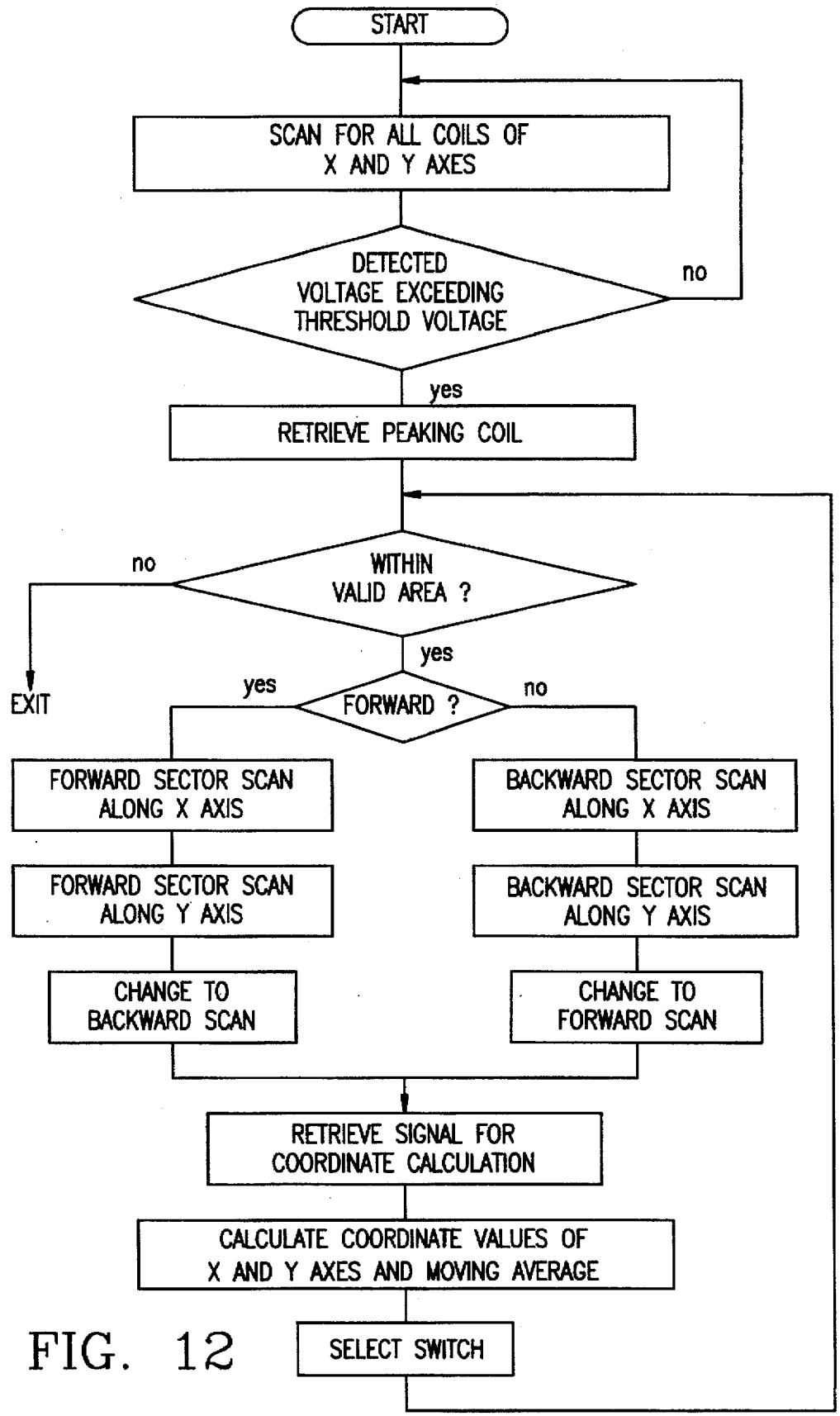
FIG. 12 is a flowchart showing software configuration of a second embodiment according to the present invention.

FIG. 12 shows the process flow chart of the present invention, the operation of which is essentially similar as that of the first embodiment except that the operations for the loop coils in X and Y axes are alternately performed, the coordinate value of the indicated position of the X and Y axes are averaged using a time-sequenced even number to calculate the moving average. Thus, according to this embodiment, it is always possible for detecting the coordinate values of the indicated positions of the X and Y axes without compensating these coordinate values, and to always calculate an accurate coordinate value of the indicator position even though the resonant frequency change occurs in the resonant circuit of the positional indicator.

It should be noted that in the present second embodiment such an improved sector scanning procedure can be performed as described with referencing FIGS. 7 and 10, which can decrease the discrepancy of the coordinate values in the peripheral region of the sensor portion 11.

Figure 13:
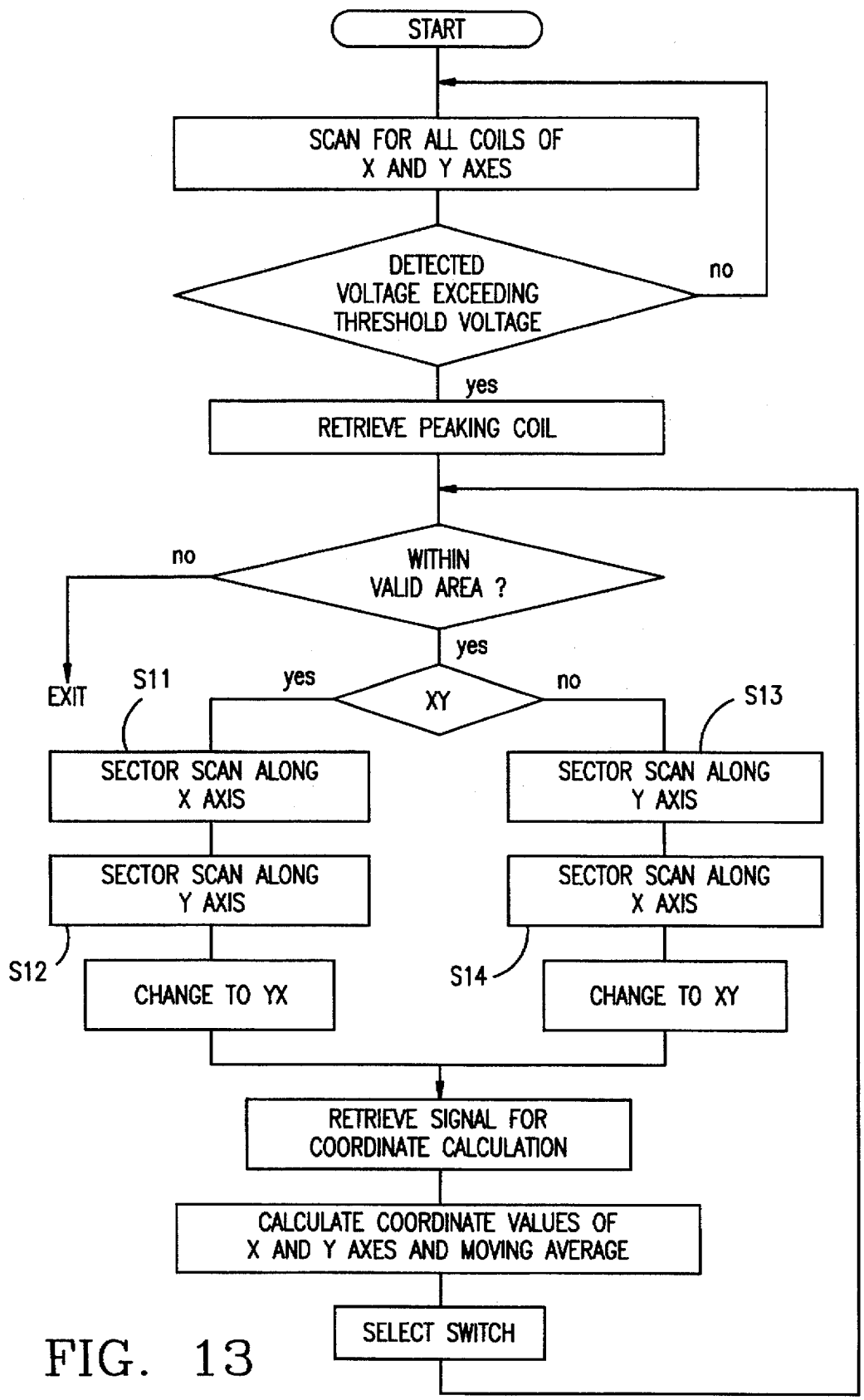
FIG. 13 is the other flowchart showing software configuration of a second embodiment according to the present invention.

FIG. 13 shows another process flow chart of the second embodiment, which differs from the flow chart shown in FIG. 12, since the order of the scanning is defined such as axes X, Y, Y, X, X, ... without considering the scanning direction. Averaging of the two coordinate values detected for X and Y axes will cancel the discrepancy in the coordination values in each of the axes so that the bowing phenomenon can be eliminated.

Figure 3:
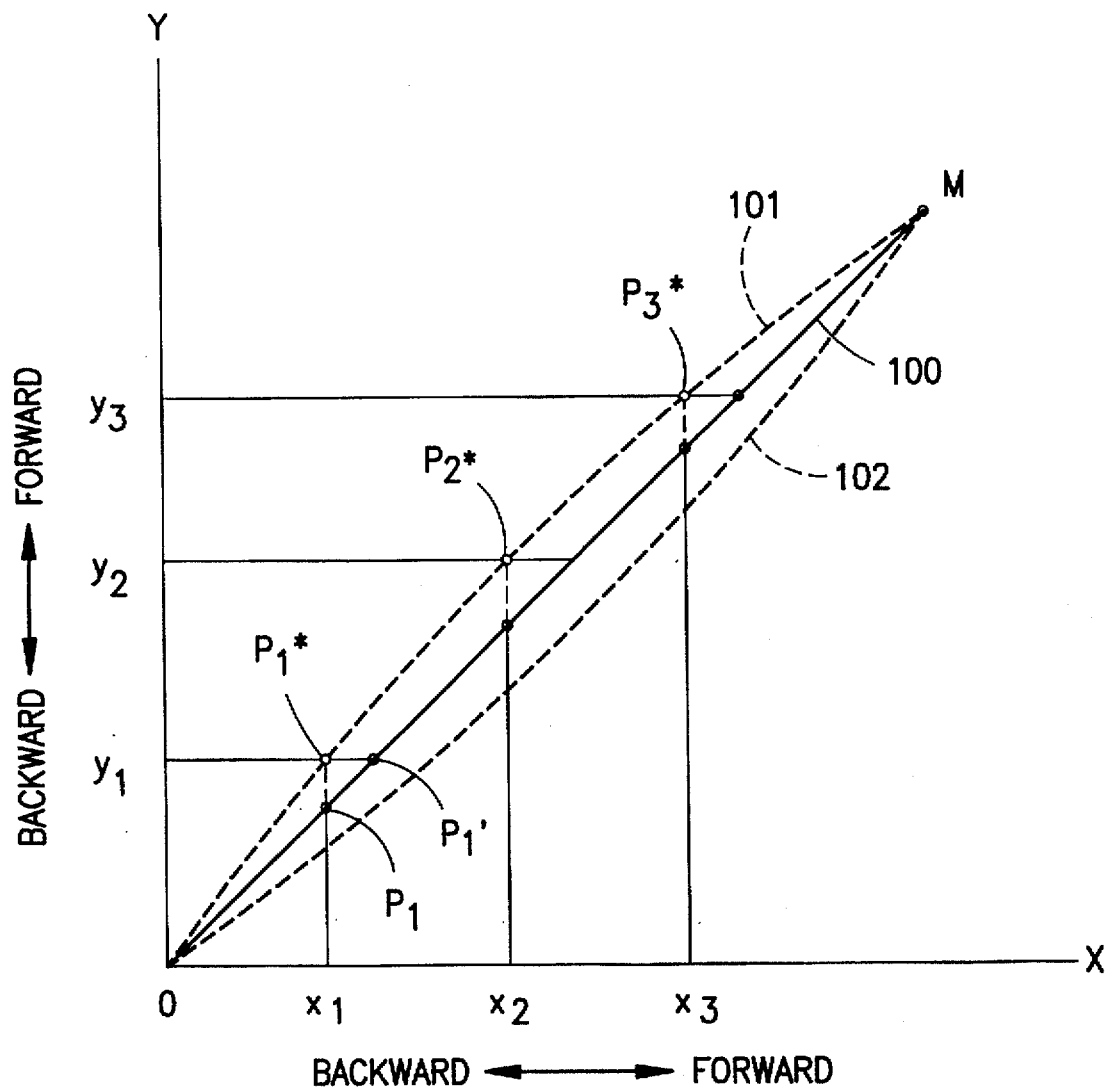
FIG. 3 is an illustrative drawing showing generation of the bowing effect.
Figure 14:
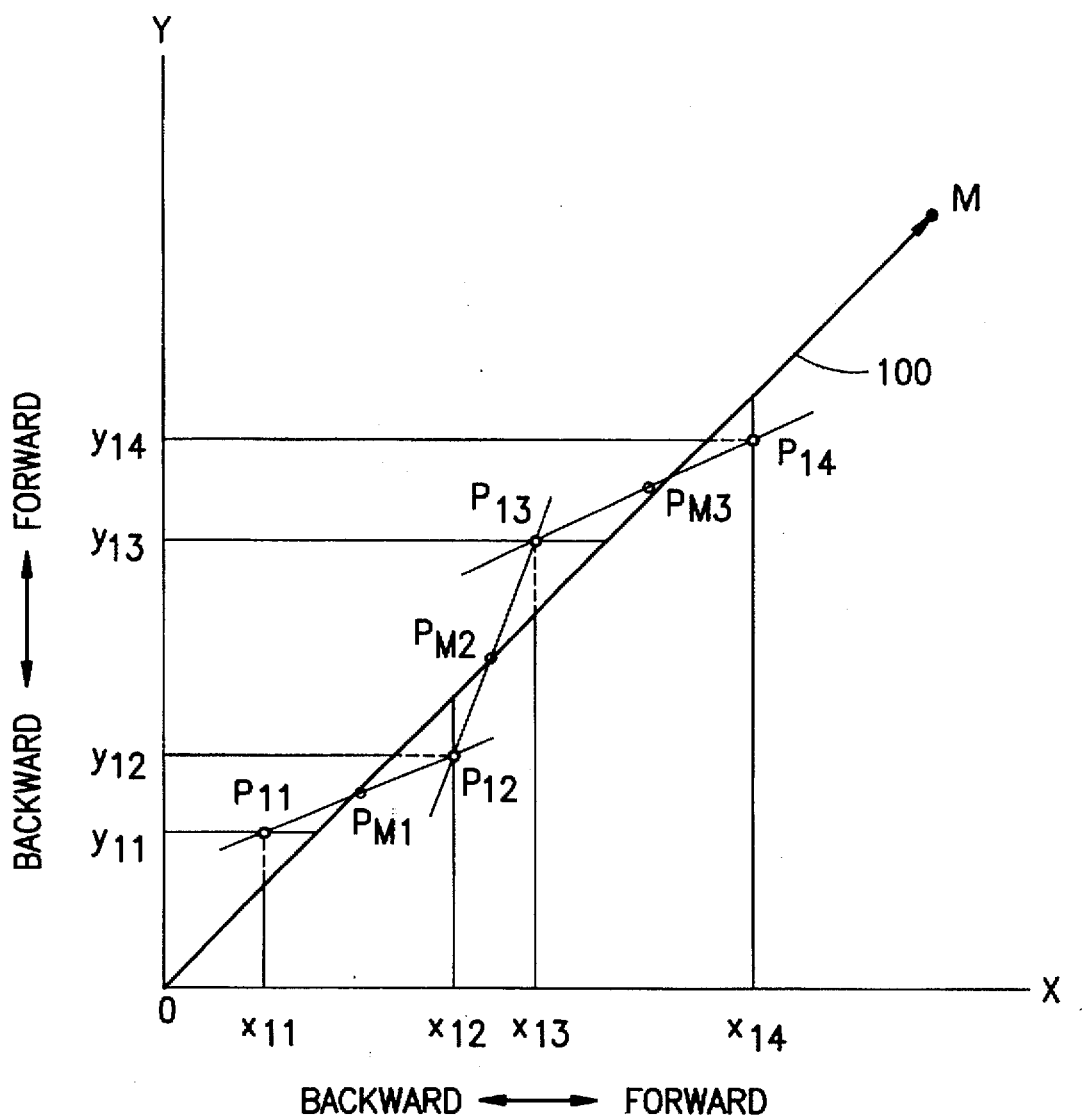
FIG. 14 is an illustrative drawing showing the cancellation of the bowing phenomenon using the process flowchart of FIG. 13.
Figure 15:
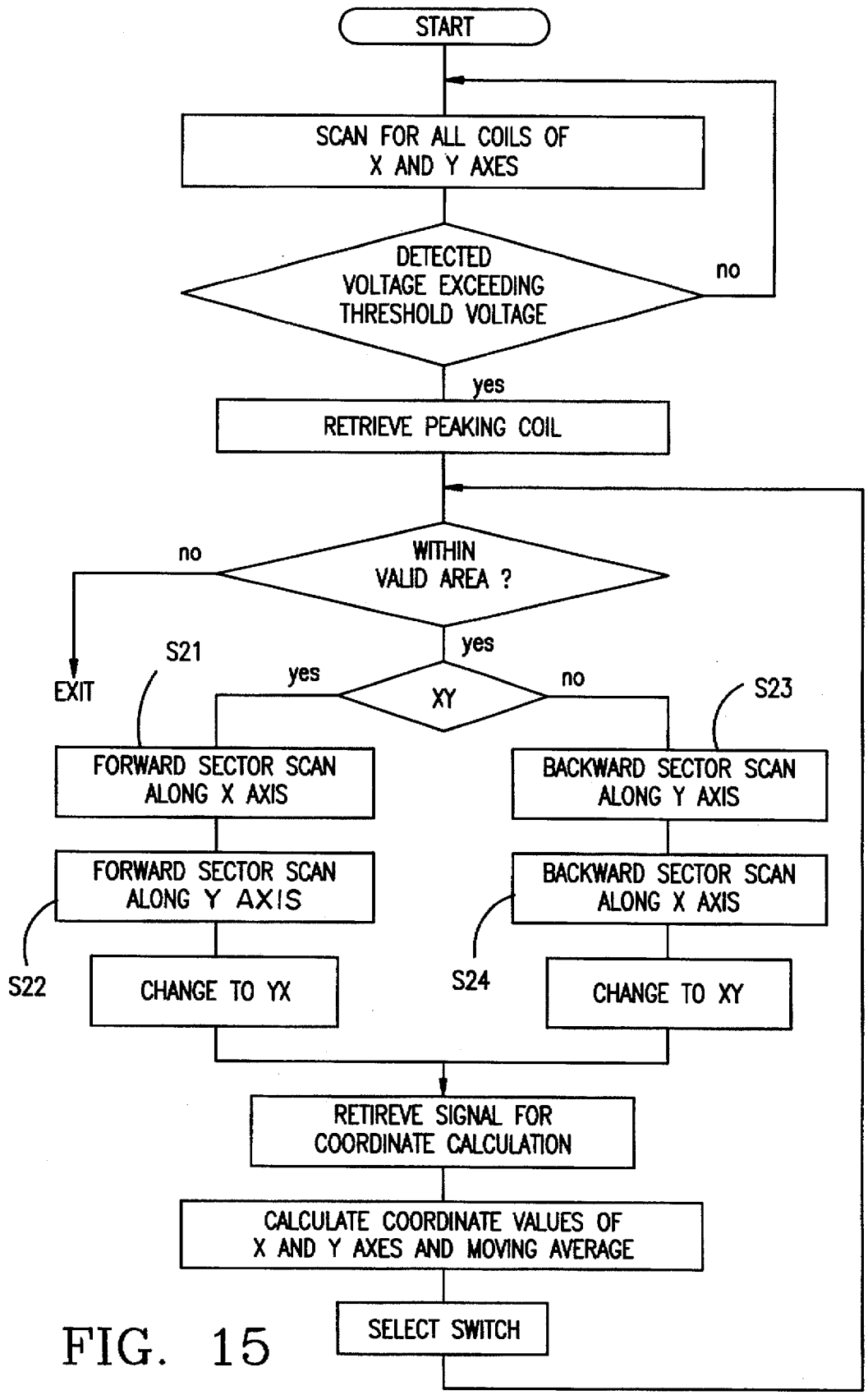
FIG. 15 is a flowchart showing another flowchart configuration of a second embodiment according to the present invention.

FIG. 14 shows the cancellation of the bowing phenomenon by performing the procedure shown in FIG. 13. That is the position $P_{11}$, which is represented by coordinate values $x_{11}$, $y_{11}$ provided by Steps 11 and 12 shown in FIG. 13, has an error in the X coordinate value same as that of shown in FIG. 3, while the position $P_{12}$, which is represented by coordinate values $y_{12}$, $x_{12}$ provided by Steps 13 and 14 shown in FIG. 13, has an error in the Y coordinate value not same as that of shown in FIG. 3. Thus, averaging these values will provide a position $P_{M1}$ in the proximity of the solid line 100. Similarly, a position $P_{M2}$ is defined by a position $P_{12}$ represented by coordinate values $(y_{12}, x_{12})$, and a position $P_{13}$ represented by coordinate values $(x_{13}, y_{13})$; and a position $P_{M3}$ is defined by a position $P_{13}$ represented by coordinate values $(x_{13}, y_{13})$, and a position $P_{14}$ represented by coordinate values $(y_{14}, x_{14})$ FIG. 15 shows still another process flow chart of the second embodiment, which differs from the flow chart shown in FIG. 12, since the order of the scanning is defined such as axes X, Y, Y, X, X, ... Scanning in such order and direction, and averaging of the two coordinate values detected for X and Y axes will cancel out the discrepancy in the coordination values in each of the axes so that the bowing phenomenon can be eliminated, and the discrepancy in the coordination values in the residual induction voltage in the resonant circuit can also be eliminated.

Figure 16:
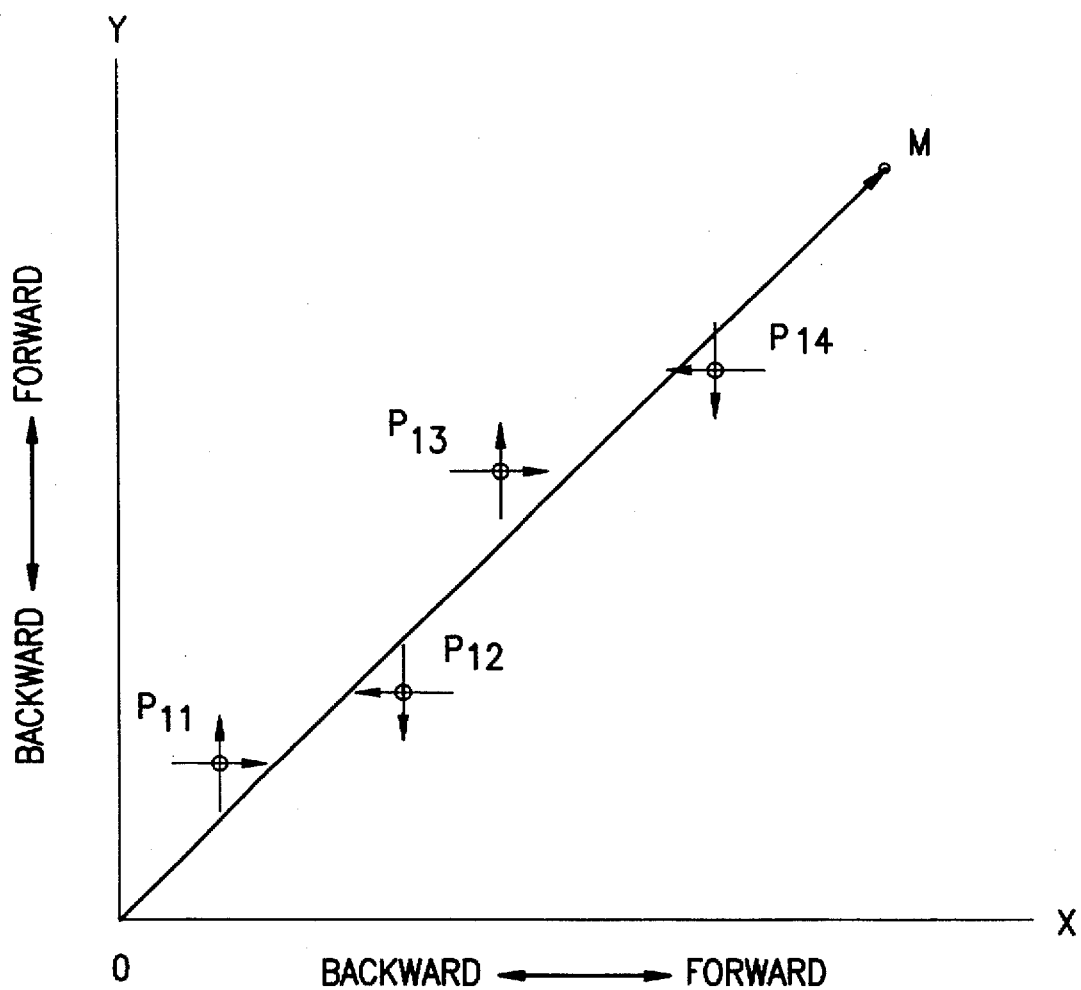
FIG. 16 is an illustrative drawing showing the cancellation of the bowing phenomenon and the residual induction voltage using the process flowchart of FIG. 15.

FIG. 16 shows the cancellation of the bowing phenomenon by performing the procedure shown in FIG. 15, and also cancellation of the discrepancy of the coordinate values caused by the residual voltage in the resonant circuit. That is the x and y coordination values calculated in Step S21 and S22 are from forward scanning, and the x and y coordination values of the position $P_{12}$ calculated in Step S23 and S24 are from backward scanning so that the position, for example, x and y coordinate values of the position $P_{M1}$ provided by averaging of these values will cancel the discrepancy in each of these directions, and the discrepancy caused by the residual voltage in the resonant circuit.

It should be noted that a number of loop coils are alternately connected both at the transmission and the reception, however the transmission may be performed by the most nearest loop coil locating to the positional indicator at the transmission of the electric wave.

As described above, according to the claims 1 and 2 of the present invention, the discrepancy which is caused by the residual induction voltage in the coordinate value of the indicator position detected by the induction voltage at the selecting and scanning of the loop coils occurs in reverse for one and the other directions in selecting and scanning of a number of the loop coils. Using the discrepancy, since it occurs similarly whether there is coincidence or not between the frequencies of the resonant circuit and the transmission wave, these coordinate values are averaged to cancel out the discrepancies without compensating these coordinate values, and to calculate always an accurate coordinate value of the indicator position even though the resonant frequency change occurs in the resonant circuit of the positional indicator.

Furthermore, according to the claims 3 and 4 of the present invention, an accurate coordinate value of the indicator position can always be provided without compensating for these coordinate values themselves, and even though the resonant frequency change occurs in the resonant circuit of the positional indicator in detecting the coordinate value of the indicated position by the position indicator, based upon at least two detected induction voltages.

Also, according to the claims 5 and 6 of the present invention, a pseudo selectable loop coil can be disposed before the loop coil comes to be selected at detecting the induction voltage which is used for calculating the coordination value, so that it can generate similar induction voltage even at the position where the positional indicator is located at near the end toward the position detecting direction, thus a coordinate value of a low level of error can be provided.

Furthermore according to the claims 7 and 8 of the present invention, a coordination value of a low level of error can also be provided when the positional detector is located near the end toward the position detecting direction, wherein no selectable loop coil exists and before the loop coil comes to be selected at detecting the induction voltage which is used for calculating the coordination value.

Furthermore according to the claims 9 and 10 of the present invention, using the fact that the discrepancy from the real position to be indicated, which results from the detection time difference for X and Y axes, differs depending on whether selecting and scanning of the position detecting means toward Y axis is performed after that of X axis, or selecting and scanning of the position detecting means toward X axis is performed after that of Y axis, wherein the former results in the discrepancy of the coordinate value of X axis, and the latter results in the discrepancy of Y axis, averaging each an even number of time sequenced coordinate values of indicated position of X and Y axes will cancel the discrepancy of the coordinate value in each of directions so that the bowing phenomenon can be eliminated.

Furthermore according to the claims 11 and 12 of the present invention, using the fact that the discrepancy from the real position to be indicated, which results from the detect time difference for X and Y axes, is different depending on whether selecting and scanning of the loop coils toward Y axis is performed after that of X axis, or selecting and scanning of the loop coils toward X axis is performed after that of Y axis, wherein the former results in the discrepancy of the coordinate value of X axis, and the latter results in the discrepancy of Y axis, averaging each of the even number of time sequenced coordinate values of indicated position of X and Y axes will cancel the discrepancy of the coordinate value in each of directions so that the bowing phenomenon can be eliminated.

Furthermore, according to the claims 13 and 14 of the present invention, the bowing phenomenon can be eliminated, and accurate coordination values of indicator position toward X and Y axes can always be provided without compensating these coordinate values themselves, and even though the resonant frequency change occurs in the resonant circuit of the positional indicator.

Further, according to the claims 15 and 15 of the present invention, the bowing phenomenon can be eliminated in repeating selecting and scanning at one of a predetermined number of position detecting means of X and Y axes, and detecting the coordinate values of the indicated position of X and Y axes by said position indicator based upon at least two induction voltages thus detected.

Further, according to the claims 17 and 18 of the present invention, the bowing phenomenon can be eliminated in repeating selecting and scanning at one of a predetermined number of loop coils of X and Y axes, and detecting the coordinate values of the indicated position of X and Y axes by said position indicator based upon at least two induction voltages thus detected.

Further, according to the claims 19 and 20 of the present invention, the bowing phenomenon can be eliminated in repeating selecting and scanning at one of a predetermined number of position detecting means of X and Y axes, and detecting the coordinate values of the indicated position of X and Y axes by said position indicator based upon at least two induction voltages thus detected, and accurate coordination values of indicator position toward X and Y axes can always be provided without compensating these coordinate values themselves, even though the resonant frequency change occurs in the resonant circuit of the positional indicator. Accurate coordination values of indicator position toward X and Y axes can always be provided without compensating these coordinate values themselves, and even though the resonant frequency change occurs in the resonant circuit of the positional indicator.

What is claimed is:

1. A method for detecting position through induction voltage generated by electromagnetic effect between one of a multiple loop coils positioned parallel to each other toward a positional detecting direction and a position indicator having at least one coil, and if the position of the position indicator is identified, then for selecting and scanning one of a predetermined number of coils centering a loop coil which is detected to have the maximum induction voltage of the multiple loop coils, to repeat, and for detecting the coordinate value of the position indicator based upon at least two induction voltages thus detected, wherein said method includes steps for selecting the loop coil which is located at a symmetrical position of the loop coil which is detected to have the maximum induction voltage before the loop coil at one end or the other is selected when the position indicator is positioned at one end toward the positional detecting direction or near the other end, and the number of selectable loop coils is not satisfactory and the selecting and scanning is performed from said one end to the other end.

2. A device for detecting position through induction voltage generated by electromagnetic effect between one of a multiple loop coils positioned parallel to each other toward a positional detecting direction and a position indicator having at least one coil, and if the position of the position indicator is identified, then for selecting and scanning one of a predetermined number of coils centering the a loop coil which is detected to have the maximum induction voltage of the multiple loop coils to repeat, and for detecting the coordinate value of the position indicator based upon at least two induction voltages thus detected, wherein said device includes:

means for selecting the loop coil which is located at a symmetrical position of the loop coil which is detected to have the maximum induction voltage, before the loop coil at one end or the other is selected when the position indicator is positioned at one end toward the position detecting direction or near the other end, and the number of selectable loop coils is not satisfying said predetermined number of loop coils in sequentially selecting and scanning said predetermined number of loop coils.

3. A method for detecting position through induction voltage generated by electromagnetic effect between one of a multiple loop coils positioned parallel to each other toward a positional detecting direction and a position indicator having at least one coil, and if the position of the position indicator is not identified, then for selecting and scanning one of said multiple loop coils to repeat, otherwise, for sequential selecting and scanning one of a predetermined number of loop coils centering the loop coil which is detected to have the maximum induction voltage of said multiple loop coils to repeat, and for detecting the coordinate value of the position indicator based upon at least two induction voltages thus detected, wherein said method includes step of:

selecting the loop coil which is located at a symmetrical position of the loop coil which is detected to have the maximum induction voltage, before the loop coil at one end or the other is selected, when the position indicator is positioned at one end toward the position detecting direction or near the other end, and the number of selectable loop coils is not satisfying said predetermined number of loop coils in sequentially selecting and scanning said predetermined number of loop coils, and a change in strength of the electromagnetic effect during the loop coil at said symmetrical position is selected, in response to the induction voltage levels of the loop coils at both sides of the loop coils which are detected to have the maximum induction voltage.

4. A device for detecting position through induction voltage generated by electromagnetic effect between one of a multiple loop coils positioned parallel to each other toward a positional detecting direction and a position indicator having at least one coil, and if the position of the position indicator is not identified, then for selecting and scanning one of said multiple loop coils to repeat, otherwise, for sequential selecting and scanning one of a predetermined number of loop coils centering the loop coil which is detected to have the maximum induction voltage of said multiple loop coils to repeat, and for detecting the coordinate value of the position indicator based upon at least two induction voltages thus detected, wherein said device includes:

means for selecting the loop coil which is located at a symmetrical position of the loop coil which is detected to have the maximum induction voltage, before the loop coil at one end or the other is selected, when the position indicator is positioned at one end toward the position detecting direction or near the other end, and the number of selectable loop coils is not satisfying said predetermined number of loop coils in sequentially selecting and scanning said predetermined number of loop coils, a control means for changing the strength of the electromagnetic effect during the loop coil at said symmetrical position is selected, in response to the induction voltage levels of the loop coils at both sides of the loop coils which is detected to have the maximum induction voltage.

5. A method for detecting position through physical variable generated by physical effect between one of a multiple position detecting members positioned parallel to each other toward X and Y axial directions and a position indicator, and for selecting and scanning one of said multiple position detecting members of said X and Y axial directions to repeat, and for detecting the coordinate value of the indicated position of X and Y axial directions by said position indicator based upon at least two variables thus detected, wherein said method includes steps of:

alternatively selecting between selecting and scanning periods of the position detecting members of X and Y axial directions during each of coordinate detecting periods, when a selecting and scanning period for X axial direction and another selecting and scanning period for Y axial direction are joined into a single coordinate detect period, averaging an even number of time sequenced coordinate values of indicated positions of X and Y axial directions based upon the physical variables at the alternation of said selecting and scanning periods.

6. A device for detecting position through physical variable generated by physical effect between one of a multiple position detecting members positioned parallel to each other toward X and Y axial directions and a position indicator, and for selecting and scanning one of said multiple position detecting members of said X and Y axial directions to repeat, and for detecting the coordinate value of the indicated position of X and Y axial directions by said position indicator based upon at least two variables thus detected, wherein said device includes:

means for alternatively selecting between selecting and scanning periods of the position detecting members of X and Y axial directions during each of coordinate detecting periods, when a selecting and scanning period for X axial direction and another selecting and scanning period for Y axial direction are joined into a single coordinate detect period, means for averaging an even number of time sequenced coordinate values of indicated positions of X and Y axial directions based upon the physical variables at the alternation of said selecting and scanning periods.

7. A method for detecting position through induction voltage generated by an electromagnetic effect between one of a multiple loop coil positioned parallel to each other toward X and Y axial directions and a position indicator having at least a coil, and for selecting and scanning one of said multiple loop coils of said X and Y axial directions to repeat, and for detecting the coordinate value of the indicated position of X and Y axial directions by said position indicator based upon at least two variables thus detected, wherein said method includes steps of:

alternatively selecting between selecting and scanning periods of the multiple loop coils of X and Y axial directions during each of coordinate detecting periods, when a select and scan period for X axial direction and another selecting and scanning period for Y axial direction are joined into a single coordinate detect period, averaging an even number of time sequenced coordinate values of indicated positions of X and Y axial directions based upon the physical variables at the alternation of said selecting and scanning periods.

8. A device for detecting position through induction voltage generated by electromagnetic effect between one of a multiple loop coils positioned parallel to each other toward X and Y axial directions and a position indicator having at least a coil, and for selecting and scanning one of said multiple loop coils of said X and Y axial directions to repeat, and for detecting the coordinate value of the indicated position of X and Y axial directions by said position indicator based upon at least two induction voltages thus detected, wherein said device includes:

means for alternatively selecting between selecting and scanning periods of the multiple loop coils of X and Y axial directions during each of coordinate detecting periods, when a select and scan period for X axial direction and another selecting and scanning period for Y axial direction are joined into a single coordinate detect period, means for averaging an even number of time sequenced coordinate values of indicated positions of X and Y axial directions based upon the induction voltages at the alternation of said selecting and scanning periods.

9. A method for detecting position through induction voltage generated by electromagnetic effect between one of a multiple loop coils positioned parallel to each other toward X and Y axial directions and a position indicator having at least a coil, and for selecting and scanning one of said multiple loop coils of said X and Y axial directions to repeat, and for detecting the coordinate value of the indicated position of X and Y axial directions by said position indicator based upon at least two induction voltages thus detected, wherein said method includes steps of:

alternatively selecting between selecting and scanning periods of the multiple loop coils of X and Y axial directions during each of coordinate detecting periods, when a select and scan period for X axial direction and another selecting and scanning period for Y axial direction are joined into a single coordinate detect period, and alternating selecting and scanning directions of the loop coils, averaging an even number of time sequenced coordinate values of indicated positions of X and Y axial directions based upon the induction voltages at the alternation of said selecting and scanning periods and the selecting and scanning direction.

10. A device for detecting position through induction voltage generated by an electromagnetic effect between one of a multiple loop coils positioned parallel to each other toward X and Y axial directions and a position indicator having at least a coil, and for selecting and scanning one of said multiple loop coils of said X and Y axial directions to repeat, and for detecting the coordinate value of the indicated position of X and Y axial directions by said position indicator based upon at least two induction voltages thus detected, wherein said device includes:

means for alternatively selecting between selecting and scanning periods of the multiple loop coils of X and Y axial directions during each of coordinate detecting periods, when a select and scan period for X axial direction and another selecting and scanning period for Y axial direction are joined into a single coordinate detect period, and alternating for selecting and scanning directions of the loop coils, means for averaging an even number of time sequenced coordinate values of indicated positions of X and Y axial directions based upon the induction voltages at the alternation of said selecting and scanning periods and the selecting and scanning directions.

11. A method for detecting position through physical variable generated by physical effect between one of a multiple position detecting member positioned parallel to each other toward X and Y axial directions and a position indicator, and if the position of the position indicator is not identified, then for sequential selecting and scanning one of a predetermined number of position detecting members of X axial direction centering a position detecting member which is detected to have the maximum variable to repeat, and for sequential selecting and scanning one of a predetermined number of position detecting members of Y axial direction centering a position detecting member which is detected to have the maximum variable to repeat, and for detecting the coordinate values of the indicated positions of X and Y axial directions by the position indicator based upon at least two variables thus detected, wherein said method includes steps of:

alternatively selecting between selecting and scanning periods of the position detecting members of X and Y axial directions during each of coordinate detecting periods, when a selecting and scanning period for X axial direction and another selecting and scanning period for Y axial direction are joined into a single coordinate detect period, averaging an even number of time sequenced coordinate values of indicated positions of X and Y axial directions based upon the physical variables at the alternation of said selecting and scanning periods.

12. A device for detecting position through physical variable generated by physical effect between one of a multiple position detecting member positioned parallel to each other toward X and Y axial directions and a position indicator, and if the position of the position indicator is not identified, then for sequential selecting and scanning one of a predetermined number of position detecting members of X and Y axial directions to repeat, and otherwise, for sequential selecting and scanning one of a predetermined number of position detecting members of X axial direction centering a position detecting member which is detected to have the maximum variable to repeat, and for sequential selecting and scanning one of a predetermined number of position detecting members of Y axial direction centering a position detecting member which is detected to have the maximum variable to repeat; and for detecting the coordinate values of the indicated positions of X and Y axial directions by the position indicator based upon at least two variables thus detected, wherein said device includes:

means for alternatively selecting between selecting and scanning periods of the position detecting members of X and Y axial directions during each of coordinate detecting periods, when a selecting and scanning period for X axial direction and another selecting and scanning period for Y axial direction are joined into a single coordinate detect period, means for averaging an even number of time sequenced coordinate values of indicated positions of X and Y axial directions based upon the physical variables at the alternation of said selecting and scanning periods.

13. A method for detecting position through induction voltage generated by an electromagnetic effect between one of the loop coils positioned parallel to each other toward X and Y axial directions and a position indicator, and if the position of the position indicator is not identified, then for sequential selecting and scanning one of a predetermined number of loop coils of X axial direction centering a loop coil which is detected to have the maximum variable to repeat, and for sequential selecting and scanning one of a predetermined number of loop coils of Y axial direction centering the loop coil which is detected to have the maximum variable to repeat, and for detecting the coordinate values of the indicated positions of X and Y axial directions by the position indicator based upon at least two induction voltages thus detected, wherein said method includes steps of:

alternatively selecting between selecting and scanning periods of the loop coils of X and Y axial directions during each of coordinate detecting periods, when a selecting and scanning period for X axial direction and another selecting and scanning period for Y axial direction are joined into a single coordinate detect period, averaging an even number of time sequenced coordinate values of indicated positions of X and Y axial directions based upon the induction voltages at the alternation of said selecting and scanning periods.

14. A device for detecting position through physical variable generated by an electromagnetic effect between one of the loop coils positioned parallel to each other toward X and Y axial directions and a position indicator, and if the position of the position indicator is not identified, then for sequential selecting and scanning one of a predetermined number of loop coils of X axial direction centering the loop coil which is detected to have the maximum induction voltage to repeat, and for sequential selecting and scanning one of a predetermined number of loop coils of Y axial direction centering a loop coil which is detected to have the maximum induction voltage to repeat, and for detecting the coordinate values of the indicated positions of X and Y axial directions by the position indicator based upon at least two induction voltages thus detected, wherein said device includes:

means for alternatively selecting between selecting and scanning periods of the loop coils of X and Y axial directions during each of coordinate detecting periods, when a selecting and scanning period for X axial direction and another selecting and scanning period for Y axial direction are joined into a single coordinate detect period, means for averaging an even number of time sequenced coordinate values of indicated positions of X and Y axial directions based upon the induction voltages at the alternation of said selecting and scanning periods.

15. A method for detecting position through induction voltage generated by an electromagnetic effect between one of the loop coils positioned parallel to each other toward X and Y axial directions and a position indicator, and if the position of the position indicator is not identified, then for sequential selecting and scanning one of a multiple number of loop coils of X and Y axial directions, otherwise, for sequential selecting and scanning one of a predetermined number of loop coils of X axial direction centering the loop coil which is detected to have the maximum variable a repeat, and for sequential selecting and scanning one of a predetermined number of loop coils of Y axial direction centering the loop coil which is detected to have the maximum variable to repeat; and for detecting the coordinate values of the indicated positions of X and Y axial directions by the position indicator based upon at least two induction voltages thus detected, wherein said method includes steps of:

alternatively selecting between selecting and scanning periods of the loop coils of X and Y axial directions during each of coordinate detecting periods, when a selecting and scanning period for X axial direction and another selecting and scanning period for Y axial direction are joined into a single coordinate detect period, and alternating selecting and scanning directions of the loop coils, averaging an even number of time sequenced coordinate values of indicated positions of X and Y axial directions based upon the induction voltages at the alternation of said selecting and scanning periods.

16. A device for detecting position through induction voltage generated by an electromagnetic effect between one of the loop coils positioned parallel to each other toward X and Y axial directions and a position indicator, and if the position of the position indicator is not identified, then for sequential selecting and scanning one of a multiple number of loop coils of X and Y axial directions, otherwise, for sequential selecting and scanning one of a predetermined number of loop coils of X axial direction centering the loop coil which is detected to have the maximum variable to repeat, and for sequential selecting and scanning one of a predetermined number of loop coils of Y axial direction centering a loop coil which is detected to have the maximum variable to repeat; and for detecting the coordinate values of the indicated positions of X and Y axial directions by the position indicator based upon at least two induction voltages thus detected, wherein said device includes:

means for alternatively selecting between selecting and scanning periods of the loop coils of X and Y axial directions during each of coordinate detecting periods, when a selecting and scanning period for X axial direction and another selecting and scanning period for Y axial direction are joined into a single coordinate detect period, and alternating selecting and scanning directions of the loop coils, and means for averaging an even number of time sequenced coordinate values of indicated positions of X and Y axial directions based upon the induction voltages at the alternation of said selecting and scanning periods.

17. A method for detecting position through induction voltage generated by electromagnetic effect between one of a multiple loop coils positioned parallel to each other toward a positional detecting direction and a position indicator having at least one coil, said method comprising the steps of:

a) selecting and scanning along the positional detecting direction one of the multiple loop coils;

b) detecting the induction voltage produced by electromagnetic effect between one of the multiple loop coils positioned parallel to each other towards a positional detecting direction;

c) alternatively selecting for the scanning direction of the loop coils between forward and backward direction along the detecting direction; and d) calculating the coordinate values of the indicated position of the position indicator based upon at least two detected induction voltages, said calculating step including averaging the coordinate values of the indicated positions based upon the respective induction voltages generated during the alternatively selecting step.

18. A device for detecting position through induction voltage generated by electromagnetic effect between one of a multiple loop coils positioned parallel to each other toward a positional detecting direction and a position indicator having at least one coil, said device comprising:

a) means for selecting and scanning along the positional detecting direction one of the multiple loop coils;

b) means for detecting the induction voltage produced by electromagnetic effect between one of the multiple loop coils positioned parallel to each other towards a positional detecting direction;

c) means for alternatively selecting for the scanning direction of the loop coils between forward and backward direction along the detecting direction; and d) means for calculating the coordinate values of the indicated position of the position indicator based upon at least two detected induction voltages, said calculating means including means for averaging the coordinate values of the indicated positions based upon the respective induction voltages generated by said alternatively selecting means.

19. A device as in claim 18, and further comprising a pointing device with a resonance circuit.

20. A method for detecting position through induction voltage generated by electromagnetic effect between one of a multiple loop coils positioned parallel to each other toward a positional detecting direction and a position indicator having at least one coil, said method comprising the steps of:

a) selecting and scanning one of the multiple loop coils;

b) detecting the induction voltage produced by electromagnetic effect between one of the multiple loop coils positioned parallel to each other towards a positional detecting direction;

c) repeating step a) if the position of the position indicator is not identified;

d) determining the maximum induction voltage from the multiple loop coils;

e) selecting a predetermined number of loop coils centered about a loop coil determined to have the maximum induction voltage;

f) sequentially selecting and scanning the predetermined number of loop coils in a forward and a backward direction along the positional detecting direction; and g) calculating the coordinate values of the position indicator based upon at least two detected induction voltages from the predetermined number of loop coils, said calculating step including averaging the coordinate values of the indicated positions based upon the respective induction voltages generated during step f).

21. A device for detecting position through induction voltage generated by electromagnetic effect between one of a multiple loop coils positioned parallel to each other toward a positional detecting direction and a position indicator having at least one coil, said device comprising:

a) means for selecting and scanning one of the multiple loop coils;

b) means for detecting the induction voltage produced by electromagnetic effect between one of the multiple loop coils positioned parallel to each other towards a positional detecting direction;

c) means for determining the maximum induction voltage from the multiple loop coils;

d) means for sequentially selecting and scanning, in a forward and a backward direction along the positional detecting direction, a predetermined number of loop coils centered about a loop coil determined to have the maximum induction voltage; and e) means for calculating the coordinate values of the position indicator based upon at least two detected induction voltages from the predetermined number of loop coils, said calculating means including means for averaging the coordinate values of the indicated positions based upon the respective induction voltages generated by said means for sequentially selecting and scanning.

* * * * *